United States Patent [19]

Hunt

[11] Patent Number: 5,255,857
[45] Date of Patent: Oct. 26, 1993

[54] PIVOT

[76] Inventor: Nickolas J. R. Hunt, Berkeley Farm, Kilmington, Worminster, Wiltshire BA12 6RR, United Kingdom

[21] Appl. No.: 605,384

[22] Filed: Oct. 30, 1990

[30] Foreign Application Priority Data

Nov. 3, 1989 [GB] United Kingdom ............... 8924796

[51] Int. Cl.⁵ .............................................. B05B 3/12
[52] U.S. Cl. .................................................. 239/731
[58] Field of Search ....................... 239/728, 730, 731; 250/211 K, 231.13

[56] References Cited

U.S. PATENT DOCUMENTS

| | | | |
|---|---|---|---|
| 3,525,543 | 10/1967 | Oppenheimer . | |
| 3,823,730 | 7/1974 | Sandstrom et al. | 137/344 |
| 3,952,769 | 4/1976 | Ott | 137/344 |
| 4,073,309 | 2/1978 | Fraser et al. | 239/731 |
| 4,191,207 | 3/1980 | Jacobi et al. | 239/731 |
| 4,340,183 | 7/1982 | Kegel et al. . | |
| 4,434,936 | 3/1984 | Chapman | 239/731 |
| 4,564,224 | 1/1986 | Korus | 285/272 |
| 4,580,731 | 1/1986 | Kegel et al. | 239/710 |
| 4,698,616 | 10/1987 | Krohn et al. | 250/231.13 X |
| 4,760,547 | 7/1988 | Duxbury | 239/69 X |
| 4,878,614 | 8/1989 | Hach et al. . | |
| 4,899,934 | 2/1990 | Krisle | 239/1 |
| 4,978,846 | 12/1990 | Buote | 250/231.13 |

FOREIGN PATENT DOCUMENTS 2032108 4/1980 United Kingdom .
2143972A 2/1985 United Kingdom .

*Primary Examiner*—Andres Kashnikow
*Assistant Examiner*—Kevin Weldon
*Attorney, Agent, or Firm*—Larson & Taylor

[57] ABSTRACT

The invention relates to a device to maintain the alignment of two articulated elongate members, particularly adjacent spans of a mobile irrigator or pivot, there being a flexible joint between the spans, connecting them together and having freedom of rotation about the x- and y- axis and limited freedom to rotate about the z-axis, the joint including a sensor device for sensing movement and converting same to electrical energy for feeding to a computer for correcting alignment. The sensor may be a Hall Effect device or an optical sensor device.

16 Claims, 11 Drawing Sheets

PIVOT

The invention relates to a pivot that is a mobile irrigator that is a linear irrigator that usually rotates about a fixed "mast" at one end, or which is mounted for linear movement in a direction substantially at 90° to the length of the irrigator, and particularly to a mobile irrigator and alignment system.

Whichever kind of irrigator is contemplated, they are usually made up of separate spans or parts of the irrigator mounted for movement on intermediate mobile means such as wheeled towers between either the pivot and an end tower, or towers at the opposite ends. Each span is connected mechanically and fluidically that is to say each span is in fluid communication so that water, effluent or the like for irrigation can pass from one end of the pivot to the other for distribution over the ground to be irrigated. There is usually a cam and microswitch arrangement which attempt to control alignment. However, each pivot can be several hundred or even thousands of meters in length.

The pivot is thus a relatively massive structure and this leads to problems of alignment which the conventional cam and microswitch arrangement cannot satisfactorily control. One section or another can become out of line, leading to positive or negative "bowing", or positive or negative "dog-legging". This in turn leads to difficulties in movement over the ground being irrigated, uneven irrigation and sometimes loss of mobility. Moreover, over such a length there is often a pressure drop from one end of the pivot where the irrigating liquid (generally water enters, to the other, and this again leads or can lead to uneven irrigation.

It is accordingly an object of the invention to seek to mititage these disadvantages.

According to one aspect of the invention there is provided a device to maintain the alignment of two articulated elongate members, comprising a flexible joint adapted to be connected between the members and having freedom of rotation about the x- and y- axis and limited freedom to rotate about the z-axis.

The device may include a means to detect movement of the joint.

The sensor means may comprise an optical sensor device adapted to sense movement of the joint and provide a commensurate electrical signal.

According to a second aspect of the invention there is provided a mobile irrigator comprising a plurality of spans articulated together, at connection points, sensing means mounted at the connection points for securing the relative alignment of the spans, and control means adapted to respond to output for the sensing means and control the alignment of the spans.

Using the invention it is possible to provide a pivot or linear mobile irrigator in which the spans are aligned, that is to say the spans stay aligned in an imaginary line drawn between the opposite ends of the irrigator.

The sensing means at each span may be a Hall Effect means. This provides a simple, temperature independent means for providing an electrical output which can be picked up and utilised by the control means.

The control means may be connected with a remote computer.

A mobile irrigator and a control system therefor embodying the invention are hereinafter described, by way of example, with reference to the accompanying drawings.

Figure 9:
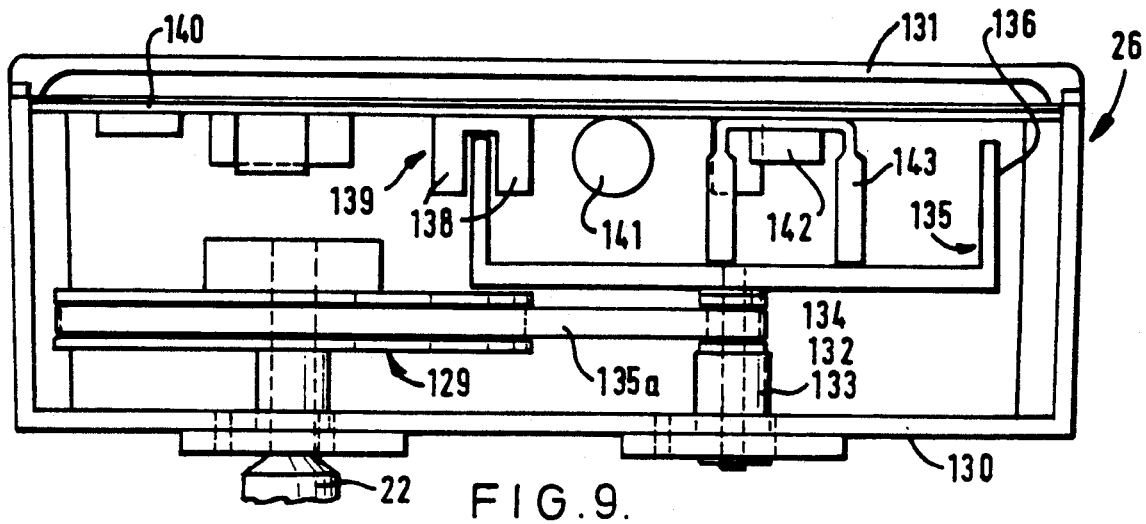
FIG. 9 is a schematic side elevational view of a sensor device according to the invention.
Figure 10:
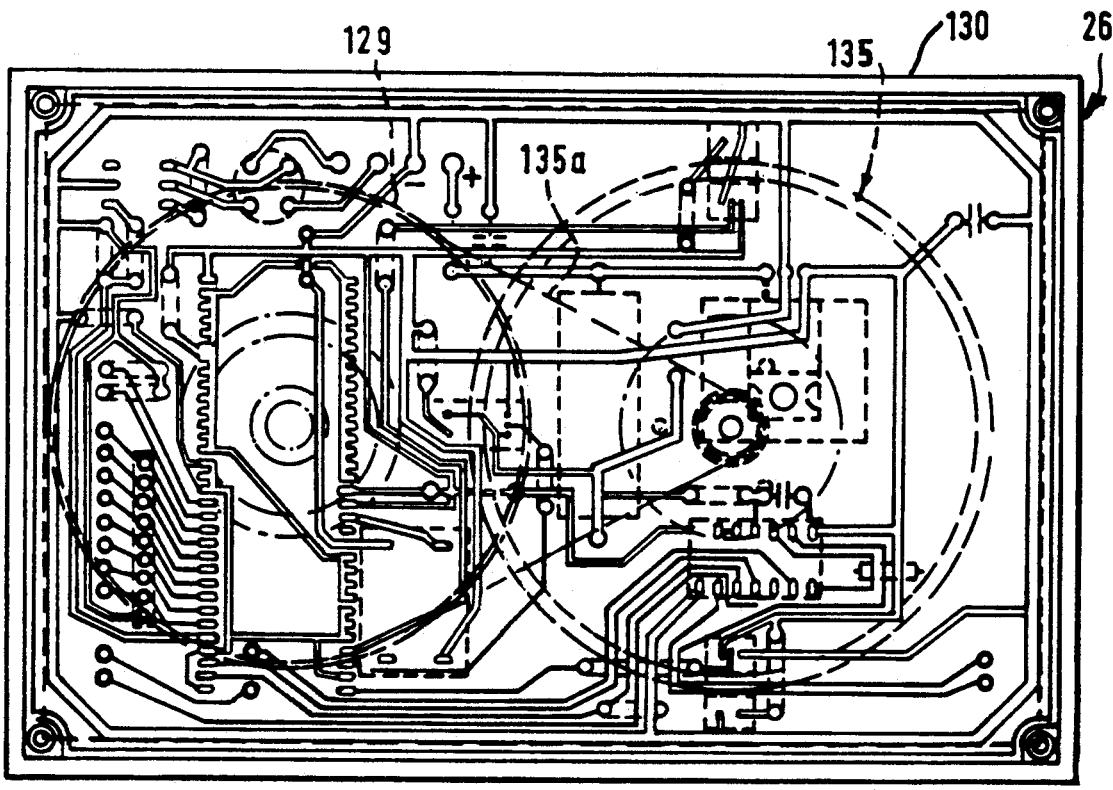
FIG. 10 is a plan view of the sensor device of FIG. 9.
Figure 11A:
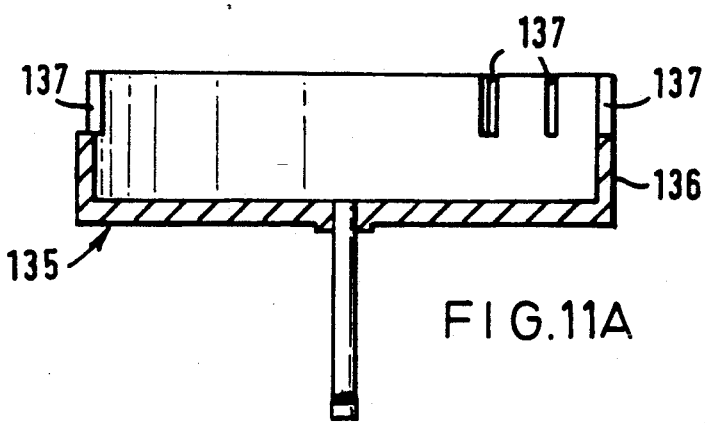
FIGS. 11A and 11B show respectively a transverse sectional and plan view of a disc of the sensor of FIGS. 9 and 10.
Figure 11B:
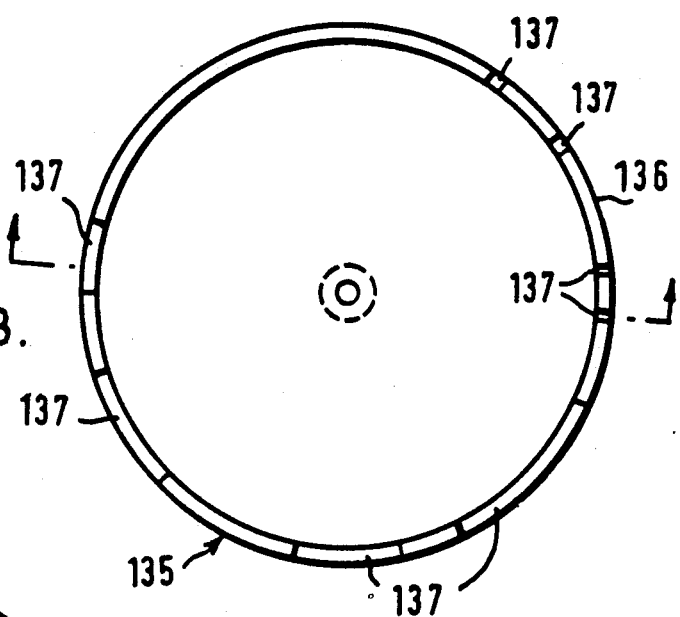
Figure 12A:
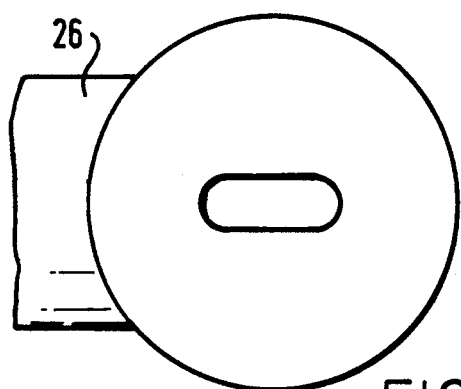
Figure 12C:
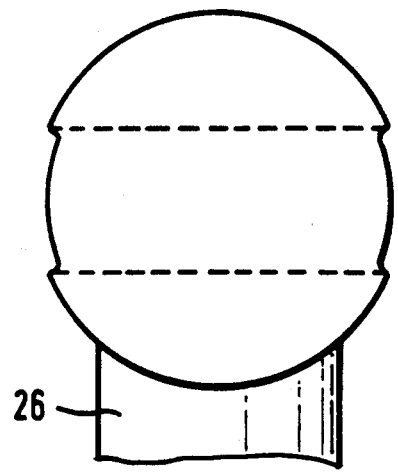
Figure 12B:
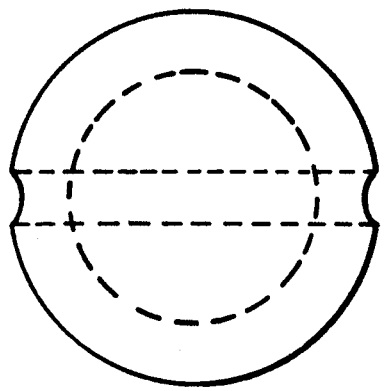
Figure 13:
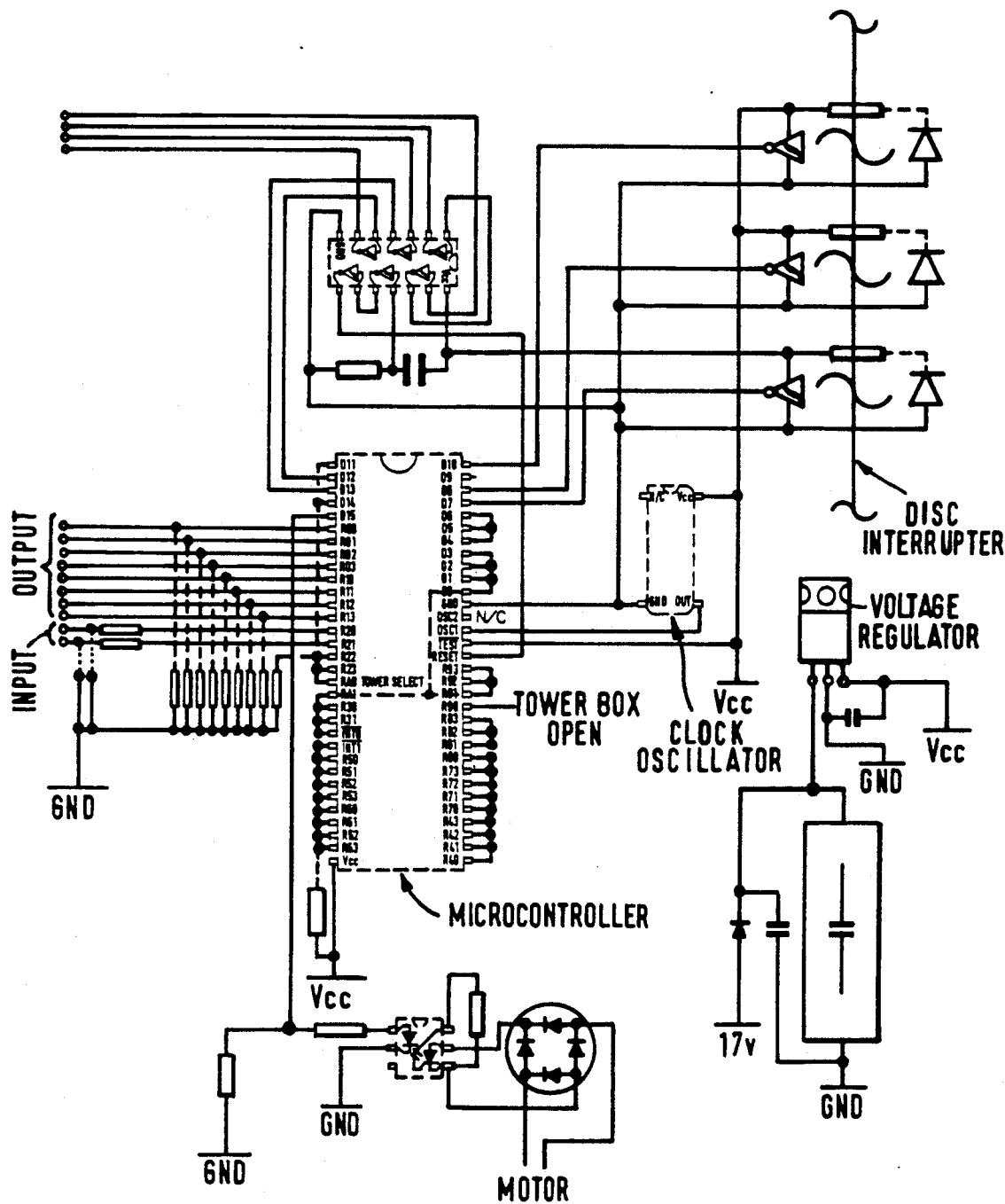
Figure 14:
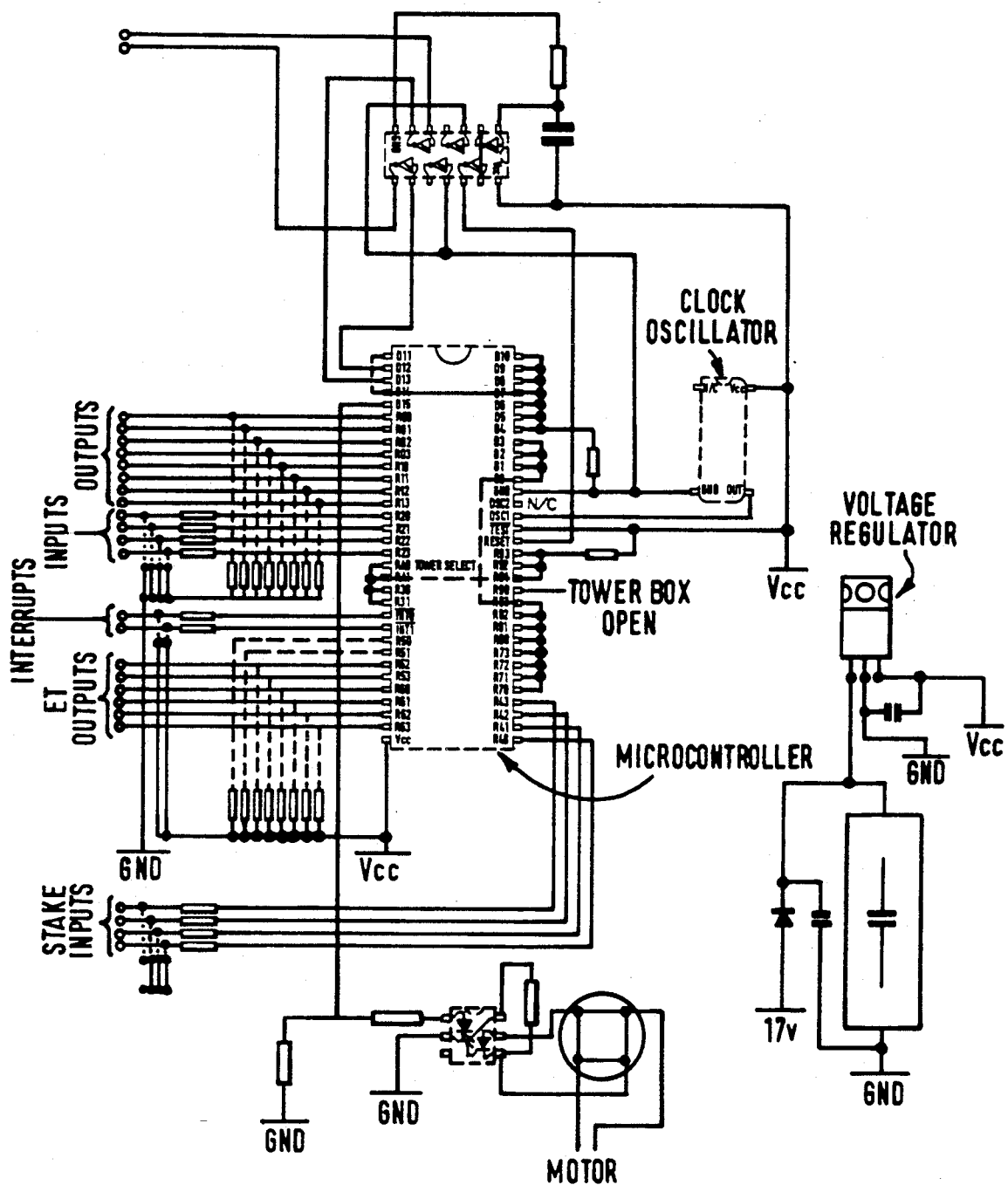
Figure 15:
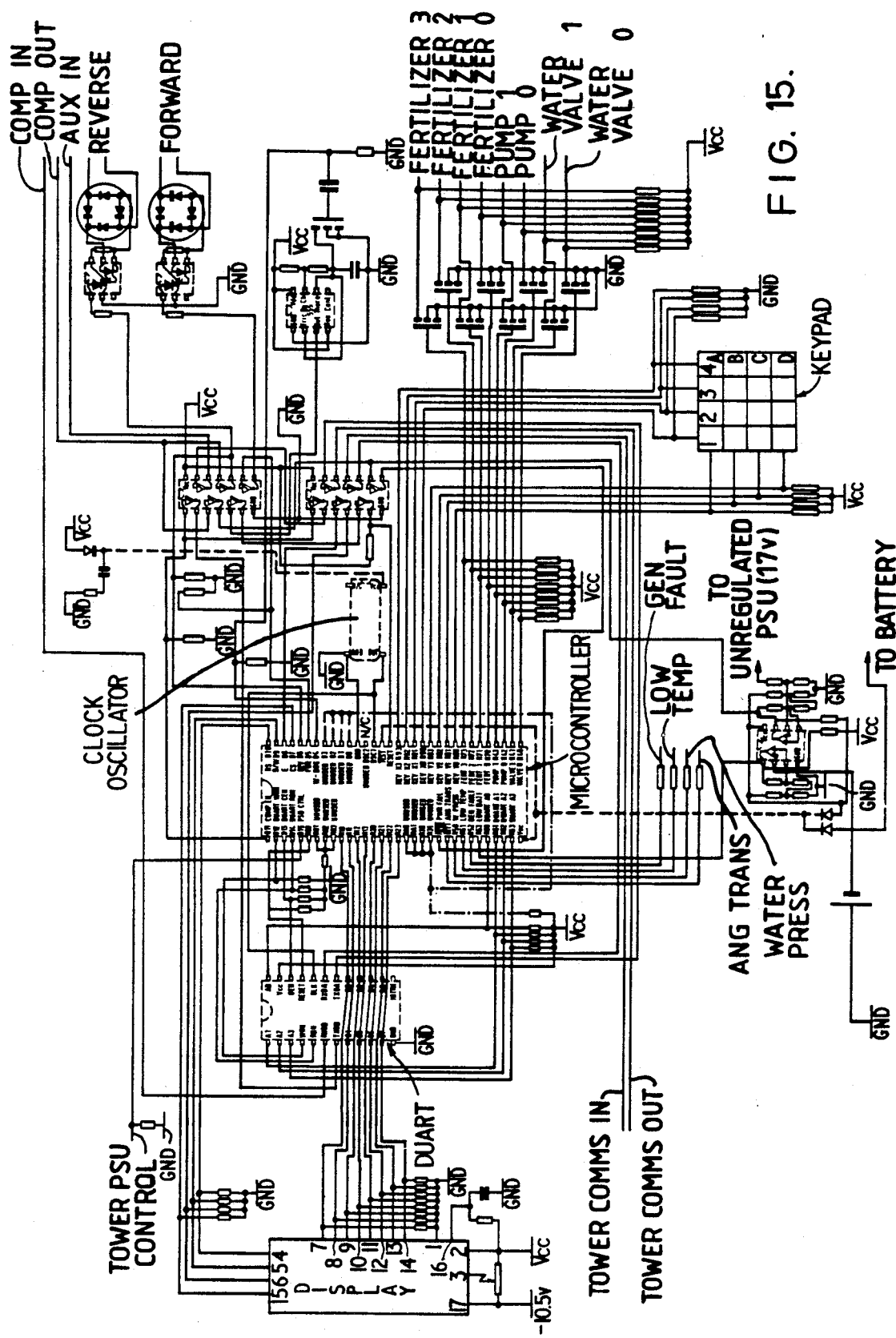
Figure 16:
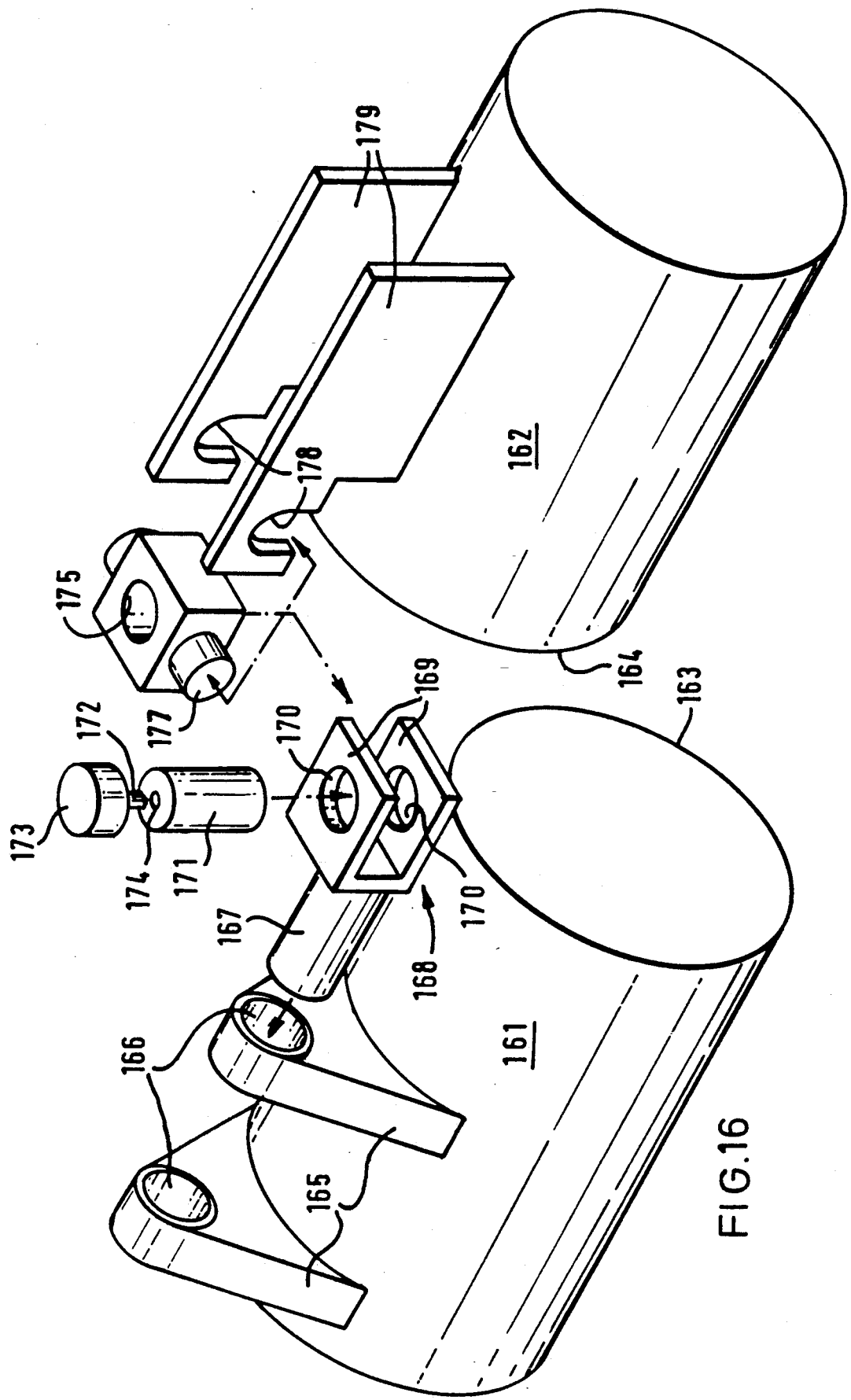

FIGS. 12A, B and C show side, plan and end elevational views of a ball socket of the sensor device according to FIGS. 9 and 10;

FIGS. 13, 14 and 15 respectively show diagrams of a circuit of an intermediate tower, an end tower and of a master circuit of a pivot according to the invention; and FIG. 16 is an enlarged exploded view of a further optical sensor device for use with a mobile irrigator according to the invention.

Figure 1:
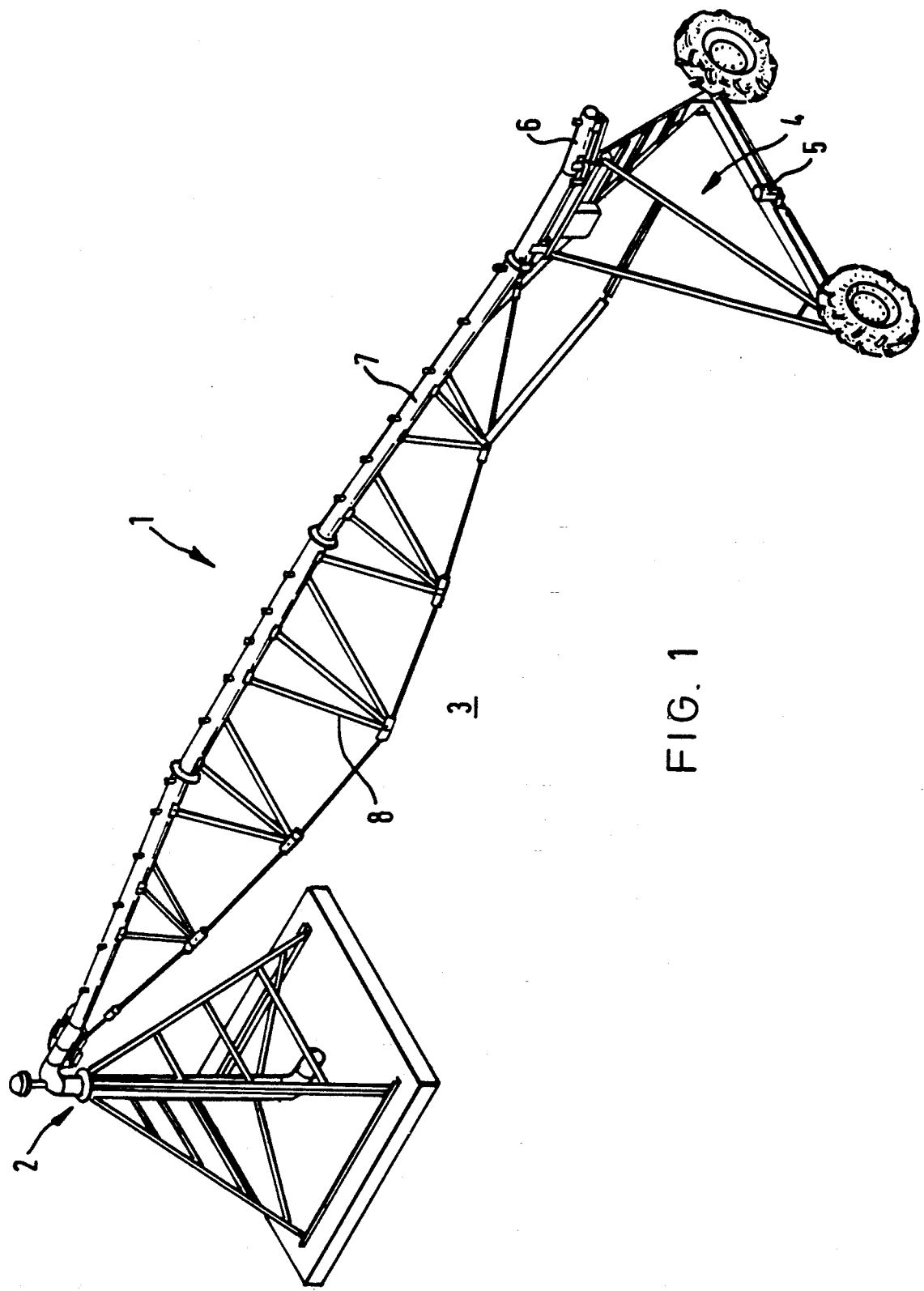
FIG. 1 is a schematic perspective view of a centre pivot irrigator.

Referring to the drawings, in which like parts are indicated by like reference numerals there is shown in FIG. 1 part of a centre pivot irrigator 1 which pivots about a central mast or pivot 2 and which comprises a plurality of separate spans 3 supported on intermediate mobile towers 4 driven by a motor 5 and articulated together at pivot points 6. Only one span 3 is shown in FIG. 1. Each span 3 comprises a pipe 7 for distributing irrigation fluid such as water, supported by a steel framework 8.

The end span of the irrigator 1, that is the one furthest from the centre pivot is supported on an end wheeled tower or frame and effectively controls the speed of the irrigator over the ground.

Figure 2:
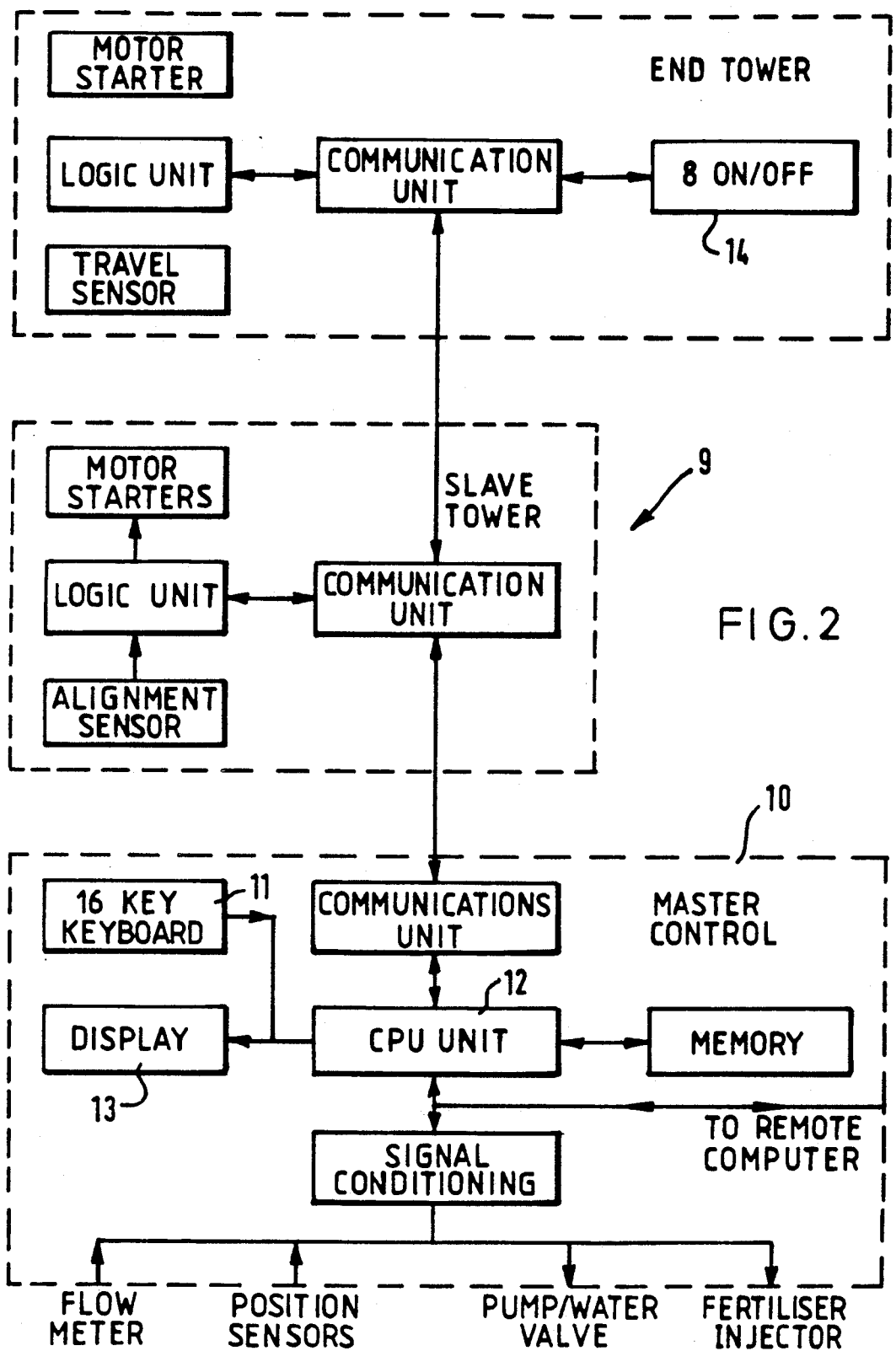
FIG. 2 is a flow diagram of the control of the irrigator of FIG. 1.

Referring to FIG. 2, there is shown schematically a system 9 for controlling a centre pivot 1 like that shown in FIG. 1.

The last tower as previously stated controls the speed of the irrigator and is started directly by a master control unit 10. The intermediate or slave towers sense their alignment with the immediately adjacent one and when any error exceeds a preset limit (20') their motor is started and is only stopped when the error is eliminated.

The master control unit 10 is located at the centre point 2. This allows an operator to communicate with and program the system via say a 16 key keyboard 11 and alphanumerical display, or by connection to a remote computer it also monitors the irrigator and in the event of a failure closes down the machine and warns the operator.

Figure 3:
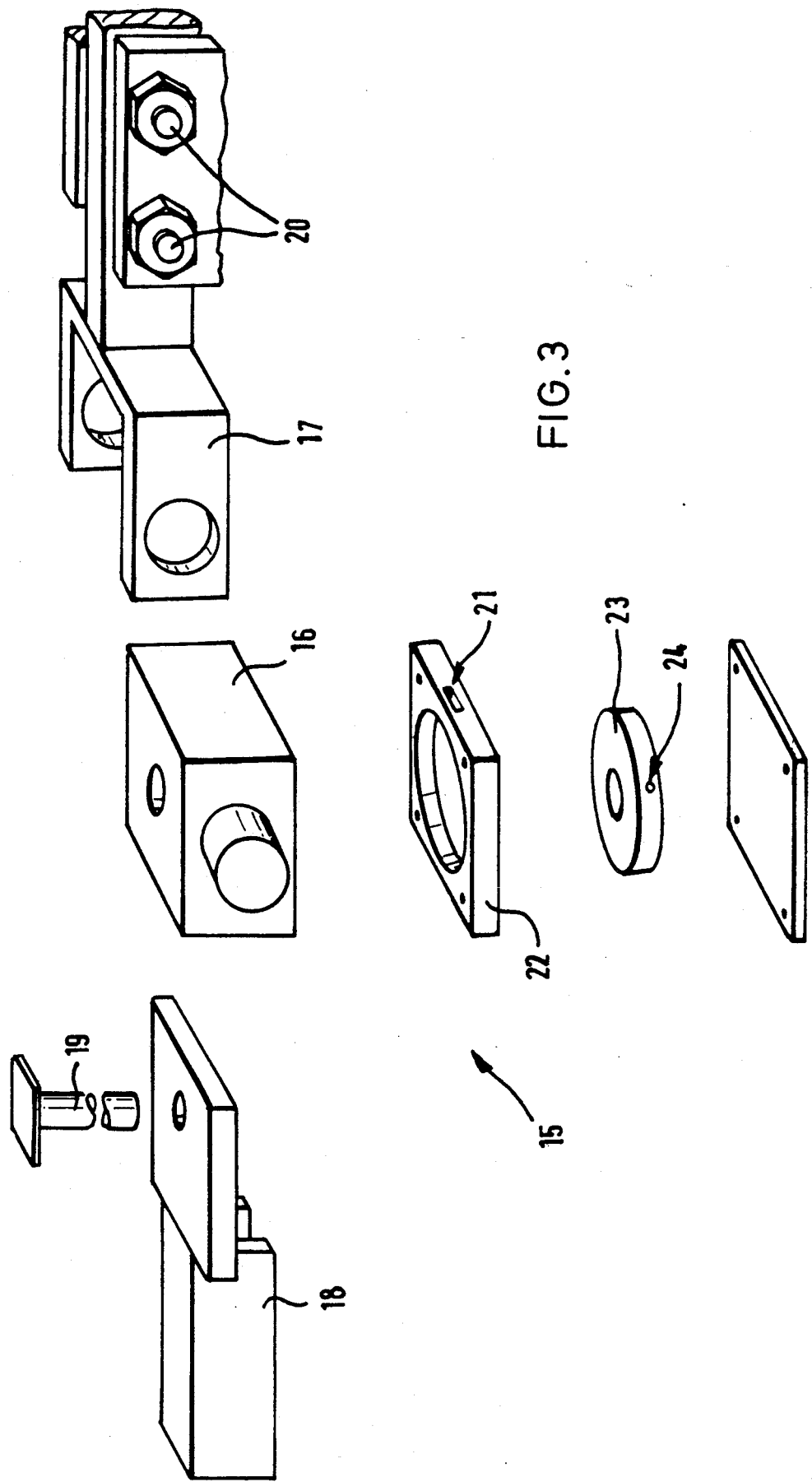
FIG. 3 is an exploded view of a Hall Effect sensing means which may be used in the invention.
Figure 4:
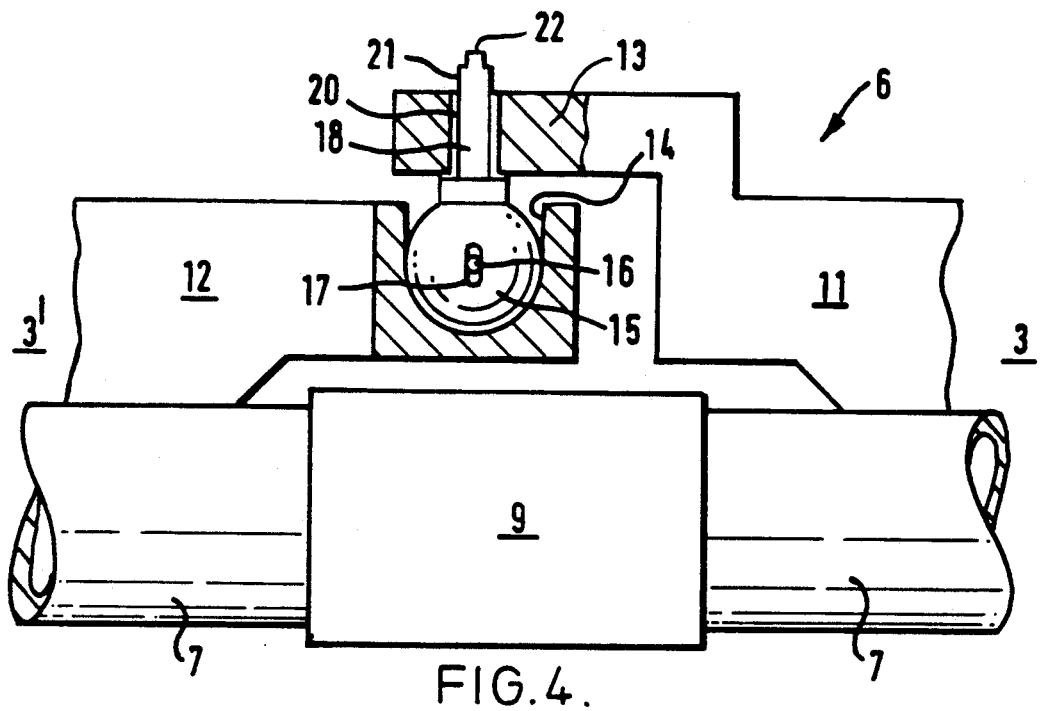
FIG. 4 is a schematic view of a pivot point of the irrigator of FIG. 1.

Referring to FIG. 3 each span is connected by a flexible joint 15 which is an integral part of the sensing element. It will be understood that for a centre pivot (or linear irrigator) to operate there must be freedom of rotation at each joint about the x- and y- axis as well as limited freedom to rotate about on the z-axis to accommodate yaw.

FIG. 3 shows the general arrangement of the sensing joint 15. Two adjacent spans are coupled to a steel block 16 one by a cleve arrangement 17 which allows freedom of rotation about the x-axis and the other by an arrangement 18 which allows freedom of rotation about the y-axis. Arrangement 18 is fixed directly to the span pipe 7 and is located to the block 16 by a pin 19 which passes through the block 16 and extends below it. Cleve 17 is held to the span pipe 7 by two bolts 20 which pass through two ball sockets which allows for a limited degree of yaw.

A linear Hall effect sensor 21 is mounted in a non-magnetic body 22. A cylinder 23 which contains a small magnet 24 fits into the body 22. Four screws locate the whole arrangement to the steel block 16, a pin 19 passing through the cylinder 23. With the two adjacent spans in a required straight line the cylinder 23 is rotated until the magnet 24 is directly opposite the sensor 21 so that maximum flux density is recorded. The cylinder 23 is then clamped to the pin 19 by a grub screw (not shown).

Since pin 19 is fixed to arrangement 18 as well as cylinder 23 a rotation of 18 about the y axis corresponding to a movement of the span to which 18 is fixed will mean a rotation of cylinder 23 the magnet 24 will move away from the sensor 21 and a different magnetic flux density will be recorded. In this way the alignment of one span to an immediately adjacent one is sensed.

The sensor 21 is a two channel linear Hall device. As magnetic flux density within the range of the sensor 21 increases so the voltage output of one channel will increase while the other will decrease. When the magnet 24 is directly opposite the sensor 21 one channel will have a maximum output while the other will have a minimum output. The two channels are fed to four voltage comparator. These are set as follows:

Comparator 1, set to give a logic one when the flux density corresponds to the desired error in alignment at which point the tower will seek to reduce the alignment error to zero.

Comparator 2, set to logic one when maximum flux density is reached i.e. no error in alignment, at this the motor will switch off.

Comparator 3, is set to give a logic one when the flux density is less than maximum but more than the threshold of comparator 1. Should the tower have received a change in direction signal from the master control the motor starter will be isolated until a logic 1 is received from comparator 2 should no signal have been received from the master control unit then the output of this comparator will be ignored.

Comparator 4, is the safety limit and is set to give a logic one at a flux density less than comparator 1, corresponding to an unacceptable error in alignment. A logic one from this comparator will isolate the motor starter and send a signal to the master control unit to shut-down the complete machine. The tower number from which this signal originated will appear on display at the master control unit.

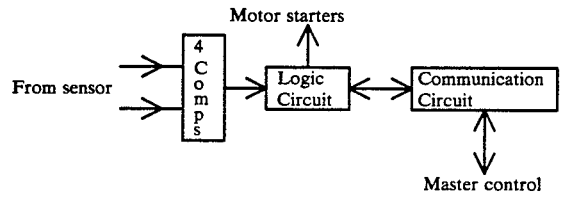

SAFETY SYSTEM

The safety system is linked to the main contactors and should the master control unit receive any signal from a safety circuit then the main power contactors will be released closing down the whole machine. The main safety components of the control system are:

1) Alignment, should the error in alignment exceed a preset limit then the machine will shut-down and display the tower which activated the safety circuit.

2) If the machine fails to move in a period of 10 minutes the safety circuit will be activated.

3) Options for low pressure, temp, shut down, the display will register the cause of the shut down.

Referring now to FIGS. 4 to 15, there is shown embodiment in which pipes of each span 3 are connected by a flexible joint or coupling 9 at the pivot points 6. There are sensing means 10 at each pivot point 6 comprising a support arm 11 on one pipe 7 of one span 3 and a support arm 12 on pipe 7 of adjacent span 3'. The support arm 11 has a projection 13 overlying a socket 14 in the support arm 12.

Figure 5:
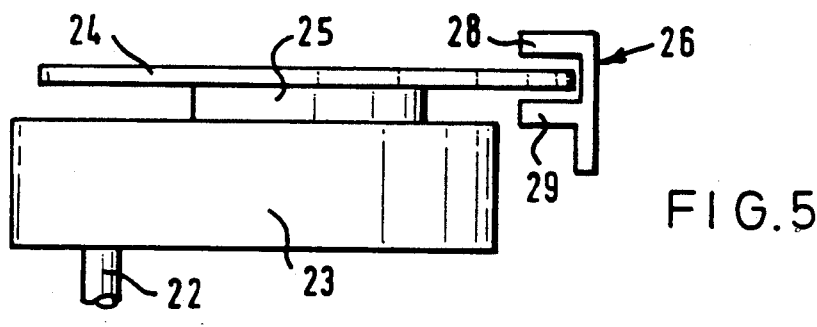
FIGS. 5 and 6 are schematic views of one embodiment of sensing means used in the invention.
Figure 6:
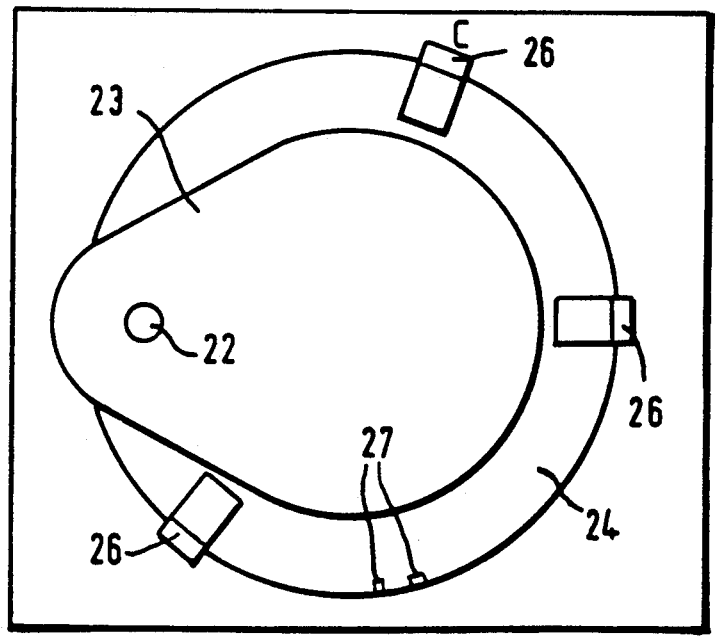

There is a ball 15 mounted in this socket, which ball 15 is fixed in one plane by a horizontal (in use) pin 16 extending through a diametrical slot 17 in the ball 15. There is an input shaft or spigot 18 projecting from the ball 15 which is supported in a bearing 20 in the projection 13 and which terminates at a distal end 21 in a coupling 22 to a sensor unit which is an input to a gear-box 23 (FIG. 5). The gear-box mounts on an output shaft 25 a rotatable disc 24, the periphery of which is movable past three sensors 26 of the sensing means 10. The sensing means comprises the three sensors 26, which are optical sensors.

The gear-box 23 is a 25:1/50:1 avoid gear-box in the embodiment shown in FIGS. 4 to 16. The disc 24 carries "code" means in the form of slots cut in its periphery and which transmit light. The code produces required or desired output at the sensor signals, e.g. "on", "off" and "safety" at the sensor 26. The slots 27 (of which only two are shown, FIG. 6) interrupt light from the light emitting sensors 26, the light passing between an emitter 28 and receiver 29 of a respective sensor. The output from each sensor 26 is then transmitted electrically to control means for the pivot 1, adapted to respond to output from the sensing means 10 to maintain the spans 3 and 3' in the desired relative configuration. Thus in operation movement of one span 3 relative to the other 3' is directly sensed by the input of the gear-box 23 via arms 11, 12 and ball 15 and socket 14. This angular movement is amplified at the output 25 of the gear-box 23 which then rotates the disc 24 to rotate it and bring the slots 27 into register with the sensors 26 so generating electrical output to which the control means can respond. Thus a slot 27 which extends 50° on either side of one sensor 26, say that identified further by "C" in FIG. 6, allows the pivot to operate on an alignment of ±2°. Should the alignment exceed 2°, the disc 24 would block the light path between 28 and 29 of sensor 26C and its output drops to logic "0".

Figure 7:
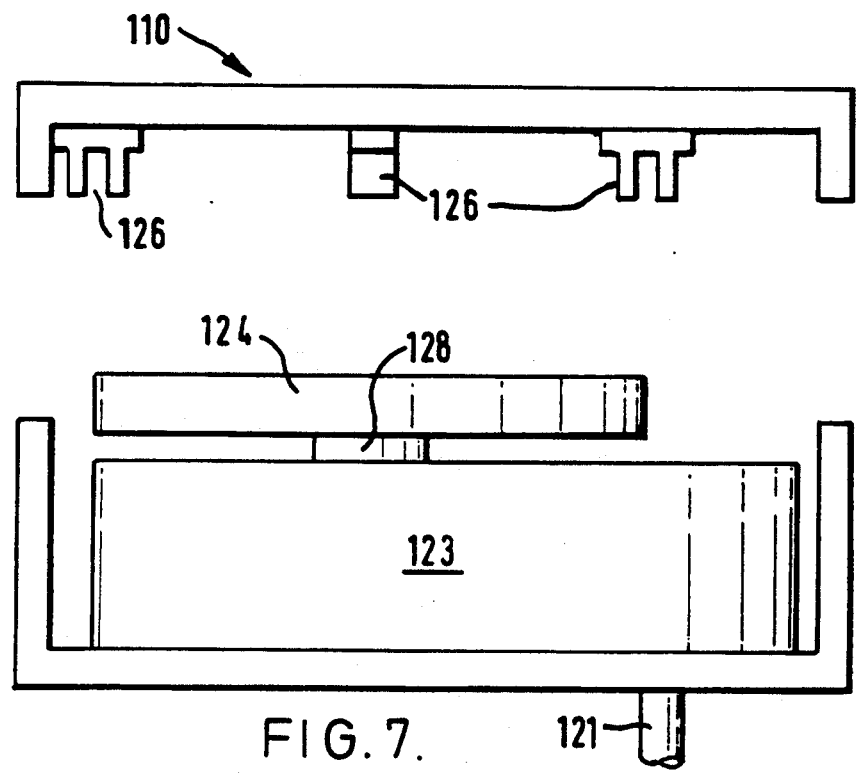
FIGS. 7 and 8 are schematic views of a second embodiment of sensing means used in the invention.
Figure 8:
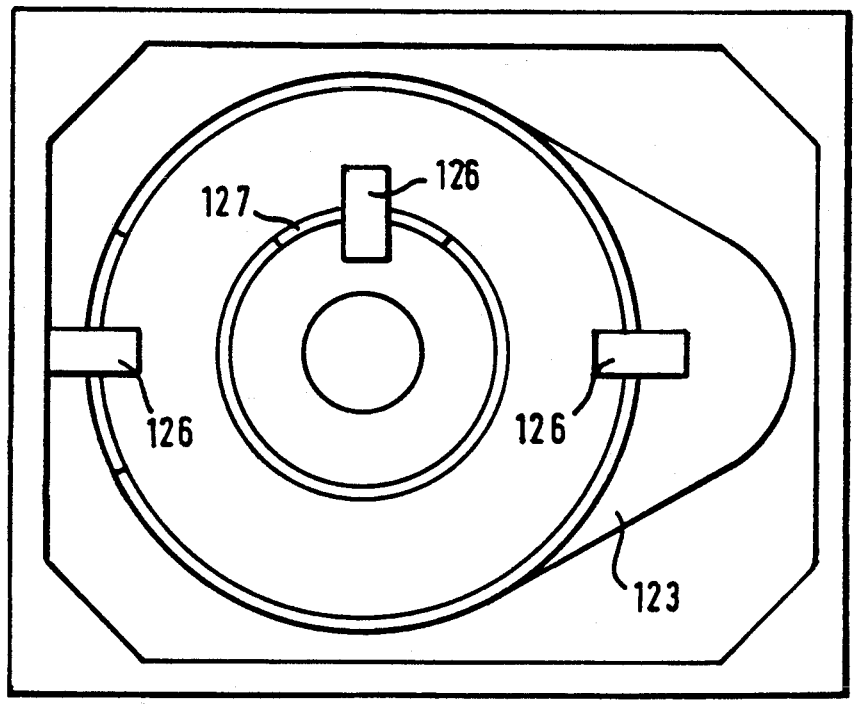

A further embodiment of sensing means, designated 110, is shown in FIGS. 7 and 8. This embodiment is similar to that of the embodiment described above, where like parts are identified by reference numerals with the addition of 100 as compared to the first embodiment, thus the gear-box in FIGS. 7 and 8 is shown as 123. In this embodiment, the sensors 126 are mounted horizontally, in use and as viewed. This allows the assembly to be smaller. The circuits of FIGS. 13, 14, 15 can be used in the second embodiment too. The sensors 26, 126 thus act as optical sensors or switches. The slots 27, 127 could be blanked off parts of a translucent or transparent disc, or clear parts of an opaque disc. In all cases, they affect the transmission of light at the sensors 26, 126, so producing an electrical signal. The sensor could also be a plurality of light transmitting means such as optical fibres, say of 50 mm diameter, mounted in a block, e.g. a plastic block by moulding, to produce a robust sensor which is compact, light, readily installed and which is stable in virtually all atmospheric conditions.

A sensing means 10 as hereinbefore described could be mounted at every point 6 of the pivot 1. Also, the ball 15 in every embodiment is fixed on one plane to provide accuracy in measurement of misalignment between the frames 3,3'.

In every embodiment, on the centre pivot alignment system, the speed is set by the end tower which in turn is controlled by the master control device 110 as shown in FIGS. 9 and 10. The intermediate towers (referred to simply as towers) sense their angular alignment with their neighbour (an adjacent tower) and when the error exceeds a preset limit the motor is started and only stopped when the error is eliminated.

The master control device 110 would in the case of a pivot be located at the centre point of the apparatus. It allows the operator to communicate with and program the system via a 16 key keyboard and a dot matrix LCD display or by connecting a remote computer. The master also-monitors the apparatus and in the event of a failure it will close down the apparatus and warn the operator.

Before the apparatus is started, it is aligned (i.e. the different spans extend in a straight line). This can be carried out using one of two methods:

1. "AUTOMATIC ALIGNMENT" On pressing this key, the message "MACHINE ALIGNING" is shown on a display until the apparatus (pivot) has straightened itself up at which point the main menu will be displayed and the machine may be started.

2. "ISOLATE" This allows manual alignment to be carried out. A tower may be isolated in this menu by keying in the tower number followed by the enter key and may be de-isolated in a similar fashion. The pivot may be rotated whilst in this menu by holding down the forward or reverse key. All towers may be de-isolated by pressing AC or by pressing STOP which also causes the display to return to the main menu.

The apparatus or pivot may be operated according to PROGRAMMABLE FUNCTIONS, as follows:

APPLICATION RATE (AMOUNT OF WATER APPLIED)

For normal operation, the operator enters the depth of water application he would like to have applied on each revolution of the pivot in millimeters, and also the application he would like applying each day (i.e. average application for a 24 hour period) also in millimeters. If either one of these values or the combination of values is not possible, then the minimum (or maximum if applicable) value is automatically selected as a default. Examples of impossible settings might be:

1. 1 mm per revolution and 10 mm per day on a machine that would take 3 hours to make one revolution. In this case the machine would have to make 10 revolutions per day to apply 10 mm, but would only have enough time to make 8 revolutions in a 24 hour period even if working non stop.

2. 1 mm per revolution on a machine that has a minimum application rate of 1.5 mm per revolution (i.e. with the end tower motor running continuously for the complete revolution).

3. 20 mm per day on a machine that is only capable of applying 10 mm per day with the water running continuously. However, if the machine was set to give 20 mm per revolution but only 10 mm per day then this would be valid and would cause the machine to make one revolution every 48 hours giving an AVERAGE application of 10 mm per day.

The switching of a motor on an end tower to achieve the desired application rate is calculated either from the fixed flow rate for the particular machine which is input at the time of machine setup, or it may be calculated from the optional flowmeter. During machine setup, the apparatus length, end boom length, wheel speed and machine origin are also input and this information is also used to calculate the end tower timing to achieve the desired application rate.

Movement of the end tower is sensed by a spider wheel and information derived from this is sent back to the master device 110 at the centre of the pivot. The master can also obtain information of machine position from stakes around the perimeter of the pivot and from the optional shaft encoder mounted at the centre point.

All information input during machine setup, current machine position, settings input by the user and all other variables are retained in battery backed RAM in the event of power failure. Low battery warning is given on the LCD display when the battery is in need of replacement.

ON/OFF FUNCTIONS

Various On/Off functions are programmable at the master control panel. The outputs on the master, towers and end tower may be used to switch any electrically operated ancillery at these points. Similarly, the inputs can signal to the master control unit an event that has occurred at the point of the relevant control unit allowing the master to take appropriate action. The available inputs and outputs are as follows:

i. Master
  Outputs:
    4*Motor
    4*Fertilizer
    2*Water Valve
    2*Pump
    1*Tower Communication
    1*Pivot Unifier Computer Communication
  Inputs:
    1*Generator Fault
    1*Low Temperature
    1*Water Pressure outside limits
    1*Angular Position incremental pulse
    1*Tower Communication
    1*Pivot Unifier Computer Communication
    1*Auxiliary data Communication
ii. Tower
  Outputs:
    2*Tower Communication
    2*Motor
    8*Tower auxiliary
  Inputs:
    2*Tower Communication
    2*Power Supply
    2*Tower auxiliary
    1*Tower door open iii. End Tower
  Outputs:
    1*Tower Communication
    2*Motor
    8*Tower Auxiliary
    6*End Tower Auxiliary
  Inputs:
    1*Tower Communication
    2*Power Supply
    1*Moved 0.5 m Interrupt
    2*Tower Auxiliary
    1*End Tower door open
    4*Marker Stake
    2*End Tower Auxiliary
    1*Auxiliary Interrupt

SEQUENCE PROGRAMMING

Using information derived from a spider wheel of the end tower spider wheel, the stakes and the optional shaft encoder, the pivot may be programmed by the operator to carry out different operations for various sectors. For instance the operator may set different application rates for different sectors (even running dry over a sector), the fertilizer may be selected for specific sectors and the machine may be programmed to auto-stop or auto-reverse at a predefined point.

DISPLAY

The display is a 32 character by 8 rows Liquid Crystal type. This shows the current status of the machine and the values that have been input. The display is also used to give details of safety shutdown should a problem occur.

The apparatus has several safety shutdown features, these are:

(1) "SAFETY SHUTDOWN—TOWER NO.xx" This occurs when tower number xx goes out of alignment (i.e. travels outside its safety limits). This could be caused by a tower that will not start (possible motor, contactor or gear-box fault) or by a tower that will not stop (possibly stuck contactor).

(2) "SAFETY SHUTDOWN—COMMUNICATIONS FAULT" This suggests a break in the communication or power supply lines to the towers.

(3) "SAFETY SHUTDOWN—END TOWER MALFUNCTION" This might be caused by the end tower not stopping (stuck contactor) or a lack of end tower movement indication (wheel slip).

(4) "SAFETY SHUTDOWN—TOWER xx MALFUNCTION" This occurs if the shaft encoder ceases to perate correctly.

(5) "SAFETY SHUTDOWN—TOWER xx BOX OPEN" This is a safety feature built into the system to ensure that the system cannot be operated whilst a tower box is open thus reducing the possible risk of electric shock.

The tower control device detects the angular position of an intermediate tower relative to the next tower and stops or starts its motor accordingly to keep the angle as close to 180 degrees as possible (i.e. to keep the pivot in a straight line). The optical sensors 26 also give signals to the tower microcontroller if the angle exceeds safety limits and also directional information to indicate whether the angle between a tower and an adjacent one is less than or greater than 180 degrees. This information is used by each tower, together with directional information sent out by the device at switch on and during a change direction cycle, to allow the tower to switch the motor on at the correct position for the specific direction. Directional information is also used to allow the machine to align itself automatically.

If the safety limit is exceeded, the tower motor is immediately switched off by the tower microcontroller and the device controller is also informed of the problem thereby allowing the complete system to be shut down.

Each tower has a unique identification number which is automatically designated to it by the master controller each time the machine is switched on. This number is transmitted with a safety code should a tower go out of alignment thus allowing the device to display the tower number at which the problem occurred. The identification number is also used for other purposes such as machine alignment.

In a further development of the system each tower sends back incremental angular data to the master controller allowing the exact position of each tower to be retained in the master controller's battery backed RAM in the event of power failure. This allows the angular switching sensitivity to be set by the operator at the Master Control Panel. An alternative embodiment of angular direct shaft sensing as opposed to mechanically amplified shaft position sensing is used.

The flexible joint at each tower between one span and the next is an integral part of the sensor. For a centre pivot or a linear irrigator to operate there must be freedom of rotation at each joint about the x and y axis as well as limited freedom to rotate about the z axis to accommodate yaw.

The kind of joint may vary according to the type of machine to which it is being fitted but it may be either of the ball joint type or the universal joint type.

The end tower has no alignment sensing and is wholly controlled by the master controller. However, the end tower does send back information from its spider wheel and perimeter stakes thus allowing the device to make informed switching decisions.

In every embodiment, referring to FIGS. 9 to 11B specifically, the sensor device 26 comprises a housing 130 with a lid 131 which has an entry for the main 22 shaft to which is fixed a timing pulley 129, the shaft 22 being parallel to a shaft 132 mounted for rotation in a bearing 133 and mounting a further timing pulley 134. There is an endless member or belt 135a in the form of a timing belt trained round the pulleys 129, 134. The shaft 132 mounts above (as viewed in FIG. 9) the pulley 134 a disc 135 of U-shape in cross-section. The disc 135 has a peripheral wall 136 in which there are slits, or areas 137 able to transmit light, the wall being arranged to pass through depending legs 138 of an optical sensor 139 which essentially is mounted on, or carried by, or is adjacent the underside of the lid 131 with an associated PCB 140, there also being equipment such as a capacitory 141, voltage regulator 142 and heat sink 143. The disc 135 allows two sensitivities namely using slits or slots 137 in the wall 136 set around orthogonal lines as shown in chain dashed lines in FIG. 11B, and by using slits or slots 137 set around diagonal dotted lines when the disc 135 is rotated through 45°. In either case, rotation of the joint 6 rotates the shaft 22, this in turn rotates the disc 135 via the belt 135a and this rotation causes the slits or slots 137 to actuate the sensor so that an electrical signal is generated which can then be used by the microprocessor to correct the alignment to provide and maintain the required linear arrangement.

Referring now to the embodiment of FIG. 16, there is shown part of a mobile irrigator having adjacent elongate members or spans in the form of pipes 161, 162. One end 163 of one pipe 161 is adjacent the other end 164 of the adjacent pipe 162, which pipes 161 and 162 are arranged and desired to lie maintained substantially in a single plane, though it will be understood that the pipes 161, 162 are shown offset for clarity in the FIG. Secured to this one end 163 of the pipe 161 as by saddles 165 there are spaced bearings 166 which receive a bolt 167 of a cleve 168, which has a channel defined by two spaced flanges 169 each with a hole 170 therethrough, the holes 170 being aligned vertically. Mounted in the aligned holes 170 is a pin 171 which fixedly mounts a shaft 172 of an optical encoder 173, that is an encoder which produces an electrical output on rotation of the shaft. The shaft 172 is secured in a hole 174 in the pin 171, which in time is received in an aperture 175 in a mounting block 176 received between the flanges 169. The block 176 itself has trunions 177 at opposite sides (only one of which is shown) and these receive hooked ends 178 of plates 179 secured to the pipe 162. The pipes 161 and 162 are thus articulated together for rotation as before any such rotation being detected by the optical sensor and converted into electrical impulses for transmission to the master control unit for actuation to produce re-alignment.

The low voltage power supply used by the remote tower and end tower electronics is supplied as a DC voltage which is simply regulated independently by each circuit board. Future electronics may have independent power supplies from the 415/480V AC power rails currently available for the motors.

It will be understood that the invention above described with reference to the drawings can be adapted to convert an existing machine, or it can be purpose-built. Moreover, virtually identical components would be used for a linear irrigator as for the pivot irrigator described, but the arrangement would be modified.

It will be understood that connections between the various sensors and motors can be by any suitable means such as fibre optic cables, to provide tower to tower communication.

Moreover, the master control unit may be controlled by a radio device such as a VHF transmitter operating say at 300 m/cs from a central station. The invention therefore provides a controlled loop communication, e.g:

Master Control⇌Tower.

Several irrigators can also be controlled from a single, remote station, by VHF as before, or a cellular telephone system.

Thus each tower could have its own number which when rung causes the tower to move in a particular way to effect alignment.

It will be understood that in apparatus as hereinbefore described and embodying this invention, all operations can be carried out from the Master Controller including isolation of towers and adjustment of individual motor switching sensitivity. The machine may also be controlled from a central computer via the optional computer link allowing a large network of irrigators to be operated from one remote point.

Periodic adjustment is eliminated and very high switching precision is achieved.

By incorporating computer technology at each tower and at the master, the quantity and complexity of wiring has been drastically reduced, thereby reducing installation time and increasing machine reliability.

An optional PC based irrigator network facility offers a complete irrigation management package. This Computer Managed Irrigation Network gives central irrigation management from anywhere on the farm or anywhere in the world. The PC displays the current status of all irrigators in the network and allows any settings to be changed. The PC also shows accumulative water application, slip correction etc. Further facilities may be incorporated as appropriate offering virtually unlimited management potential.

It will be understood that each node of the system (i.e. towers and master) is "intelligent" and is therefore capable of operating independently. However, all of the towers communicate with the master controller using a computer data communications system. This allows the number of power conductors to be reduced from 11 to 4.

When the system is started, the master carries out a diagnostic check of the complete system and initializes the slave units at each of the towers. Each slave then controls its own tower motor. Simultaneously, the master communicates with each tower several times a second and instructs the tower to switch its auxiliary outputs if they have been programmed at the master. It also checks the angle at the tower and the auxiliary inputs and acts on them accordingly.

The end tower is switched by the master using the same communications system and the master compensates for slip by making further calculations. If the slip becomes excessive, the master controller shuts down the system and displays the message "SAFETY SHUTDOWN—COMMUNICATIONS FAULT".

Because the tower angles are measured using digital transducers, there is complete flexibility of switching sensitivity which may be set up from the master keypad. This also allows the machine to compute its current position in the field allowing it to stop, reverse or change application rate, fertilizer or auxiliary output settings at any pre-programmed point without the need for marker stakes.

It will be further understood that the Hall Effect referred to herein is that effect achieved whereby when a thin sheet of metal with an electric current flowing along its length is placed in a magnetic field at right angles to it, an electromotive force is developed which is at right angles both to the direction of the magnetic field and the electric current.

I claim:

1. A mobile irrigator comprising a plurality of moveable towers including at least one intermediate tower and an end tower, a plurality of elongate members connected between said towers and adapted to distribute liquid for irrigation, and an alignment device to maintain two of said members adjacent an intermediate tower in substantial alignment, each member having a respective first end and second end, the first end of one elongate member being adjacent the second end of another elongate member, each intermediate tower comprising:
   (1) a flexible joint device:
   (2) sensor means to sense movement of said joint device and to correct any misalignment between said members whereby said members are maintained substantially in alignment by providing a commensurate electrical signal;

(3) said flexible joint device being mounted between said first end and said adjacent second end; and (4) said flexible joint device having substantially freedom of rotation about an x-axis and y-axis and relatively limited freedom to rotate about the z-axis whereby to maintain the elongate members substantially in alignment;

said irrigator further comprising a microprocessor-based control system comprising:

(i) a master programmable microprocessor-based controller;

(ii) slave microprocessor-based controller situated at the joint device of the at least one immediate tower and having unique identification means so as to enable identification thereof by said master controller, said slave controller of said intermediate tower comprising a control means responsive to said electrical signal whereby to flex said flexible joint device and maintain desired alignment, the slave controller of an intermediate tower and the sensor means of that intermediate tower constituting said alignment device for that intermediate tower; and (iii) a data communication means for providing continuous two-way communication of information between the master programmable microprocessor-based controller and the slave microprocessor-based controller based on said identification means.

2. A mobile irrigator as defined in claim 1, wherein the said sensor means comprises a digital transducer device.

3. A mobile irrigator as claimed in claim 2, wherein the digital transducer comprises an optical sensor device.

4. A mobile irrigator as defined in claim 1, wherein the sensor means comprises a digital transducer device adapted to sense movement of the joint device and to produce said commensurate electrical signal.

5. A mobile irrigator as defined in claim 4, wherein the digital transducer comprises an optical sensor device.

6. A mobile irrigator as defined in claim 5, wherein the optical sensor unit comprises a universal joint constrained against movement in one plane, and a coupling from the said joint to a gear-box, said gear-box having an output shaft mounting a rotatable disc, the periphery of which defines light transmitting and obturating means and which is spaced from and passes between an plurality of optical devices each comprising a light emitter and a light receiver.

7. A mobile irrigator as defined in claim 4, wherein the periphery of said disc comprises a plurality of blind slots extending from said periphery into the body of the disc.

8. A mobile irrigator as defined in claim 7, wherein said optical sensors are mounted horizontally.

9. A mobile irrigator as defined in claim 6, wherein said universal joint comprises a ball and socket joint.

10. A mobile irrigator as defined in claim 9, wherein said ball and socket joint is constrained against movement in said one plane by a pin extending through a slot in the ball.

11. A mobile irrigator as defined in claim 1, wherein control means comprises computer means for receiving said electrical signal from said sensor means whereby to control motor means for said members for maintaining substantial alignment thereof.

12. A mobile irrigator according to claim 1, wherein the sensing means comprises optical sensor means.

13. A mobile irrigator according to claim 1, wherein said master controller includes an alphanumeric Input/output device comprising an alphanumeric terminal.

14. A mobile irrigator according to claim 13, wherein the alphanumerical terminal comprises a 16 key keyboard and a dot matrix liquid crystal display.

15. A mobile irrigator according to claim 13, wherein the alphanumerical terminal comprises a remote computer.

16. A mobile irrigator according to claim 1, wherein the unique identification means comprises a unique identification number.

* * * * *